Nov. 4, 1952  J. N. MENDRO ET AL  2,616,184
TOOL FOR CHECKING ALIGNMENT OF TRANSMISSIONS
OF AUTOMOTIVE AND LIKE EQUIPMENT
Filed April 6, 1951

INVENTORS
Joseph N. Mendro,
Robert L. Callahan and
Robert E. Horner
BY Burns, Doane & Benedict
ATTORNEYS Patented Nov. 4, 1952

2,616,184

UNITED STATES PATENT OFFICE 2,616,184

TOOL FOR CHECKING ALIGNMENT OF TRANSMISSIONS OF AUTOMOTIVE AND LIKE EQUIPMENT

Joseph N. Mendro, Williston, and Robert L. Callahan and Robert E. Horner, Minot, N. Dak.

Application April 6, 1951, Serial No. 219,701

2 Claims. (Cl. 33—181)

1

The present invention relates to a tool for checking the alignment of transmissions in automotive and like equipment and has for its object the provision of an exceedingly simple, yet highly effective tool for use by mechanics in the installation and replacement of transmission housings and parts.

Figure 1:
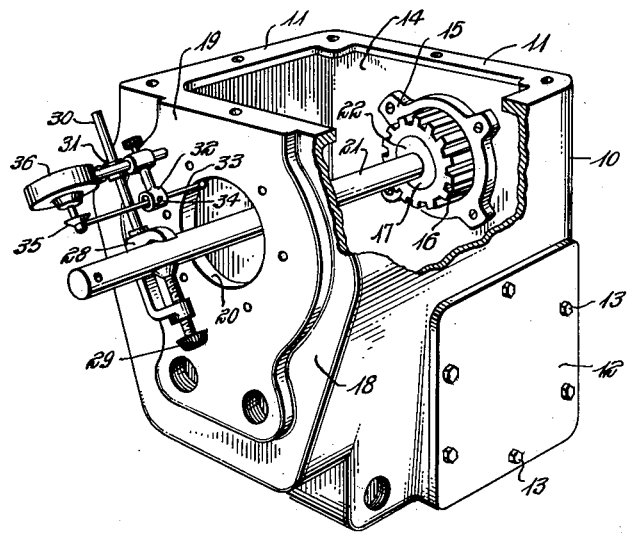
Figure 2:
Figure 3:
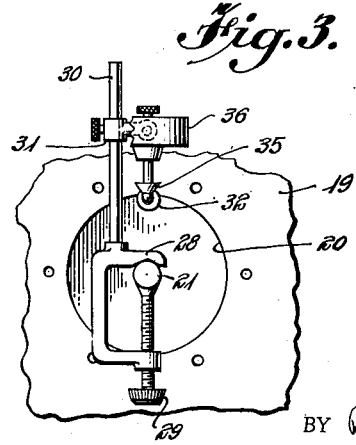

The misalignment of shafts entering and leaving a transmission housing gives rise to very serious difficulties in the effective operation of a transmission and while various expedients have been resorted to to facilitate the alignment of transmissions, there exists a distinct need for a simple, inexpensive tool for this purpose. It is the purpose and object of the present invention to provide such a tool. In its more specific aspects the invention contemplates a tool for checking the alignment of transmissions in automotive and like equipment embracing a minimum of parts capable of easy assembly and use and more particularly the provision of a tool that can be used with the transmission and housing either in position in the automotive or like equipment or when removed therefrom. Other and more specific objects and advantages of the invention will appear as the description proceeds, which will be given in reference to the accompanying drawings forming a part hereof, wherein:

Figure 1 is a perspective view with parts broken away, showing the application of the tool of the present invention and its manner of use in checking the alignment of a transmission drive shaft and housing bearing, Figure 2 is a detailed view partly in section of certain significant elements of the tool, and, Figure 3 is a fragmentary end elevation showing the position occupied by elements of the tool in use.

Referring to Figure 1, the transmission housing 10 is of more or less conventional design, having the top flange 11 from which the cover plate has been removed. The side plate 12 is shown as secured to the housing by the stud bolts 13. Secured to the interior of the forward wall 14 of the housing 10 is the reinforcing ring 15. A stub drive axle, not shown, carries the gear 16 which conventionally has the open bore 17. The rear wall 18 of the housing 10 is provided with a machined surface 19 and with a bearing opening 20. So far, the description has been addressed to the more or less conventional type of transmission housing and drive shaft and pinion gear by which power from the motor is transmitted to the gear train of the transmission.

Referring now to the specific nature of the tool

2 constituting the present invention, and referring first to Figure 2, it will be noted that the tool embraces the elongated round bar 21, the bushing 22 and the radially movable lock pin 23 mounted for radial movement in a laterally extending opening 24 of the bushing 22. The interior of the bushing 22 is threaded at 25 to receive complemental threads 26 on the bar 21. The bar 21 projects a substantial distance into the bushing beyond the threads 26 in the form of a frustum of a cone indicated at 27. The inner end of the radially movable lock pin 23 is arcuately shaped so as to ride on the cone 27. It will thus be observed that by screwing the threads 26 of the bar 21 into the threads 25 of the bushing 22, the cone 27 will be advanced into the bushing and the locking pin 23 will be cammed or wedged radially outwardly through the opening 24.

When the bushing 22 is placed within the bore of the drive gear or pinion 16 as shown in Figure 1, the bushing will pass well back into the bore 17 and then, upon rotation of the bar 21 to effect relative telescopic movement of the bar 21 and bushing 22, the locking pin 23 will be wedged or cammed radially outwardly so as to securely lock the bushing with the bushing of bar 21 in the bore 17 of the driven gear 16. The arrangement is such that when the assembly shown in Figure 2 is moved to the position shown in Figure 1 and the bar 21 turned so as to force the locking pin 24 outwardly, the bar 21 will rotate with the gear 16 and the stub drive axle not shown.

The bar 21 is of a length such that in the assembled position shown in Figure 1, its free end will project well to the rear of the transmission housing 10. It will be observed that the axis of rotation of the bar 21 coincides with the axis of rotation of the drive gear 16. On the free end of the bar 21 and at a point to the rear of the rear wall 18 of the transmission housing 10 a clamp 28 is secured by the thumb screw 29. The bar 30 projects from the clamp and lies generally parallel to the machined face 19 of the rear wall 18 of the housing 10. A bracket 31 is adjustably carried on the bar 30. The bracket 31 provides a tubular support 32 for a feeler needle 33 pivoted in the tubular support 32 at 34. One free end 35 of the feeler needle 33 bears on the plunger of a conventional indicator 36 which, in turn, is supported by the bracket 31. When the tool is positioned for use in checking the alignment of the stub drive shaft and gear with the bearing opening of the transmission housing, the feeler needle 33 will lie parallel with the bar 21. When the gear 16 is rotated, the bar 21 is caused to rotate therewith and one free end of the feeler needle 33 moves along the surface of the bearing opening 20. Any deviation from a true concentric relation will cause the feeler needle 33 to be deflected about its pivotal mounting 34, occasioning movement of the plunger of the dial 36 which will give an indication as to the extent of deviation of the bearing surface from a true concentric relationship to the axis of rotation of the bar 21. To facilitate ready application of the tool, the free end of the bar 21 may be provided with a transverse opening 37 through which a pin may be inserted to facilitate engagement and disengagement of the threads 25 and 26.

It will be appreciated that the tool can be produced economically and that it lends itself to easy use in checking the alignment of transmissions.

Having thus described our invention, what we claim is:

1. A tool for checking the alignment of transmissions in automotive and like equipment, comprising a bushing, a radially movable locking pin projectable through the wall of the bushing, an elongated bar received in said bushing and carrying a wedging surface capable on movement longitudinally of said bushing of forcing said laterally projectable locking pin radially outwardly from said bushing, said bushing being thereby adapted to be locked in the bore of a gear carried on a stub drive shaft extending into a transmission housing, means for clamping a bearing contact member to said bar, said bearing contact member including a feeler needle adapted, when in contact with a true bearing, to be positioned parallel to said bar, and an indicator associated with said feeler for indicating any misalignment of said bearing upon rotation of said bar.

2. A tool for checking the alignment of transmissions in automotive and like equipment, comprising a bushing interiorly threaded at one end, a radially movable locking pin projectable through the wall of the bushing, an elongated bar threadedly received in said bushing and carrying a wedging surface capable on movement longitudinally of said bushing of forcing said laterally projectable locking pin radially outwardly from said bushing, said bushing being thereby adapted to be locked in the bore of a gear carried on a stub drive shaft extending into a transmission housing, means for clamping a bearing contact member to said bar, said bearing contact member including a feeler needle pivotally mounted intermediate its ends and adapted, when in contact with a true bearing, to be positioned parallel to said bar, and an indicator associated with said feeler for indicating any misalignment of said bearing upon rotation of said bar.

JOSEPH N. MENDRO.
ROBERT L. CALLAHAN.
ROBERT E. HORNER.

REFERENCES CITED

The following references are of record in the file of this patent:

UNITED STATES PATENTS

| Number | Name | Date |
|---|---|---|
| 656,406 | Hopkins | Aug. 21, 1900 |
| 675,463 | Boyce | June 4, 1901 |
| 1,448,528 | Elliott | Mar. 13, 1923 |
| 1,941,022 | Shelley | Dec. 26, 1933 |